UNITED STATES PATENT OFFICE.

GUILLAUME VIQUÉ, AÎNÉ, OF BORDEAUX, FRANCE.

IMPROVEMENT IN DISINFECTING COMPOUNDS.

Specification forming part of Letters Patent No. 113,820, dated April 18, 1871.

*To all whom it may concern:*

Be it known that I, GUILLAUME VIQUÉ Aîné, of Bordeaux, France, have invented a new and Improved Compound for Disinfecting Mephitism; and I do hereby declare that the following is a full, clear, and exact description thereof, which will enable others skilled in the art to make and use the same.

The object of this invention is to produce an inexpensive but effective compound for counteracting the offensive and injurious effects of mephitic exhalations and foul odors of every kind.

The invention consists in a combination of the following ingredients, to wit: sulphate of zinc, acetate of copper, and crystallized baryta, phenic acid, and scented liquid or essence.

The proportions of the several ingredients are varied, in accordance with the greater or lesser quantity of offensive odor given out by the article or substance under action.

Having thus described my invention, I claim as new and desire to secure by Letters Patent—

The disinfecting compound consisting of the ingredients herein specified.

The above specification of my invention signed by me this 23d day of December, 1870.

GUILLAUME VIQUÉ, AÎNÉ. [L. S.]

Witnesses:
L. R. DUCLOS,
L. DEPIUENLI.